United States Patent
Déclas

(10) Patent No.: US 6,383,082 B1
(45) Date of Patent: May 7, 2002

(54) CONSTANT-VELOCITY BALL JOINT

(75) Inventor: Frédéric Déclas, Paris (FR)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/701,907

(22) PCT Filed: Apr. 5, 2000

(86) PCT No.: PCT/FR00/00860

§ 371 Date: Dec. 5, 2000

§ 102(e) Date: Dec. 5, 2000

(87) PCT Pub. No.: WO00/60248

PCT Pub. Date: Oct. 12, 2000

(30) Foreign Application Priority Data

Apr. 6, 1999 (FR) .................................. 99 04270

(51) Int. Cl.$^7$ .................................. F16D 3/223
(52) U.S. Cl. .................................. 464/145; 464/906
(58) Field of Search .................. 464/145, 906, 464/139, 141, 143

(56) References Cited

U.S. PATENT DOCUMENTS

| | | | | |
|---|---|---|---|---|
| 2,838,919 A | * | 6/1958 | Cull | 464/145 |
| 3,553,979 A | * | 1/1971 | Noguchi et al. | 464/145 |
| 3,789,624 A | * | 2/1974 | Camosso | 464/145 |
| 3,919,861 A | * | 11/1975 | Bellomo | 464/145 |
| 4,494,941 A | * | 1/1985 | Hirai et al. | 464/145 |
| 4,589,857 A | * | 5/1986 | Okoshi | 464/145 |
| 4,610,643 A | * | 9/1986 | Krude | 464/143 |
| 4,915,672 A | * | 4/1990 | Girguis | 464/145 |
| 4,968,287 A | * | 11/1990 | Jacob | 464/145 |
| 5,122,096 A | * | 6/1992 | Aucktor et al. | 464/145 |
| 6,120,382 A | * | 9/2000 | Sone et al. | 464/145 |
| 6,227,979 B1 | * | 5/2001 | Yamamoto et al. | 464/145 |
| 6,299,542 B1 | * | 10/2001 | Ouchi et al. | 464/145 |

FOREIGN PATENT DOCUMENTS

| | | |
|---|---|---|
| FR | 2 205 141 A | 5/1974 |
| FR | 2 295 298 A | 7/1976 |
| JP | 08 128454 A | 9/1996 |

* cited by examiner

Primary Examiner—Lynne H. Browne
Assistant Examiner—Kenneth Thompson

(57) ABSTRACT

In this ball joint the centers (B, C) of the director lines (16, 17) of the two grooves (9, 12) in each of said axial half-planes, in the aligned position of the joint, being offset axially and symmetrically relative to the transverse diametral plane (P) of the joint and radially by the same distance (d2) relative to the central axis (X—X, Y—Y) of the joint on the side opposite the grooves, with a radial offset from approximately 15% to approximately 25% of the pitch circle diameter of the joint.

7 Claims, 3 Drawing Sheets

CONSTANT-VELOCITY BALL JOINT

The present invention relates to a fixed constant-velocity ball joint of the type described in the preamble of claim 1.

A ball joint having a radial offset has already been proposed. The aim was to avoid any overhang or undercutting of the grooves of the bell at their entry, to facilitate fabrication and assembly of the joint. To achieve this result, the offset must be of the order of 100% of the pitch circle diameter (PCD), which is the distance between the centers of two balls contained in the transverse diametral plane of the joint as measured in said plane and in the aligned position.

In ball joints, in the maximum break position, the ball which is entering the break plane, which is the plane which contains the axes of the two shafts, and outside the break angle, exerts a high force on the groove of the bell, very close to its entry edge. The torque transmission capacity is therefore limited by the risk of this area of the bell collapsing.

The object of the invention is to provide a ball joint in which the aforementioned force is greatly reduced and interaction between the balls and the grooves in the other positions of the balls, and in particular the maximum contact forces, are kept within acceptable limits.

To this end, the invention provides a fixed constant-velocity ball joint of the aforementioned type characterized in that said radial offset is from approximately 15% to approximately 25% of the pitch circle diameter of the joint.

The ball joint according to the invention can have one or more of the features of claims 2 to 5, taken separately or in all technically feasible combinations.

The invention also provides:
an automobile vehicle transmission including at least one ball joint as defined hereinabove; and
an automobile vehicle including at least one such transmission.

One embodiment of the invention will now be described with reference to the accompanying drawings, in which.

Figure 1:
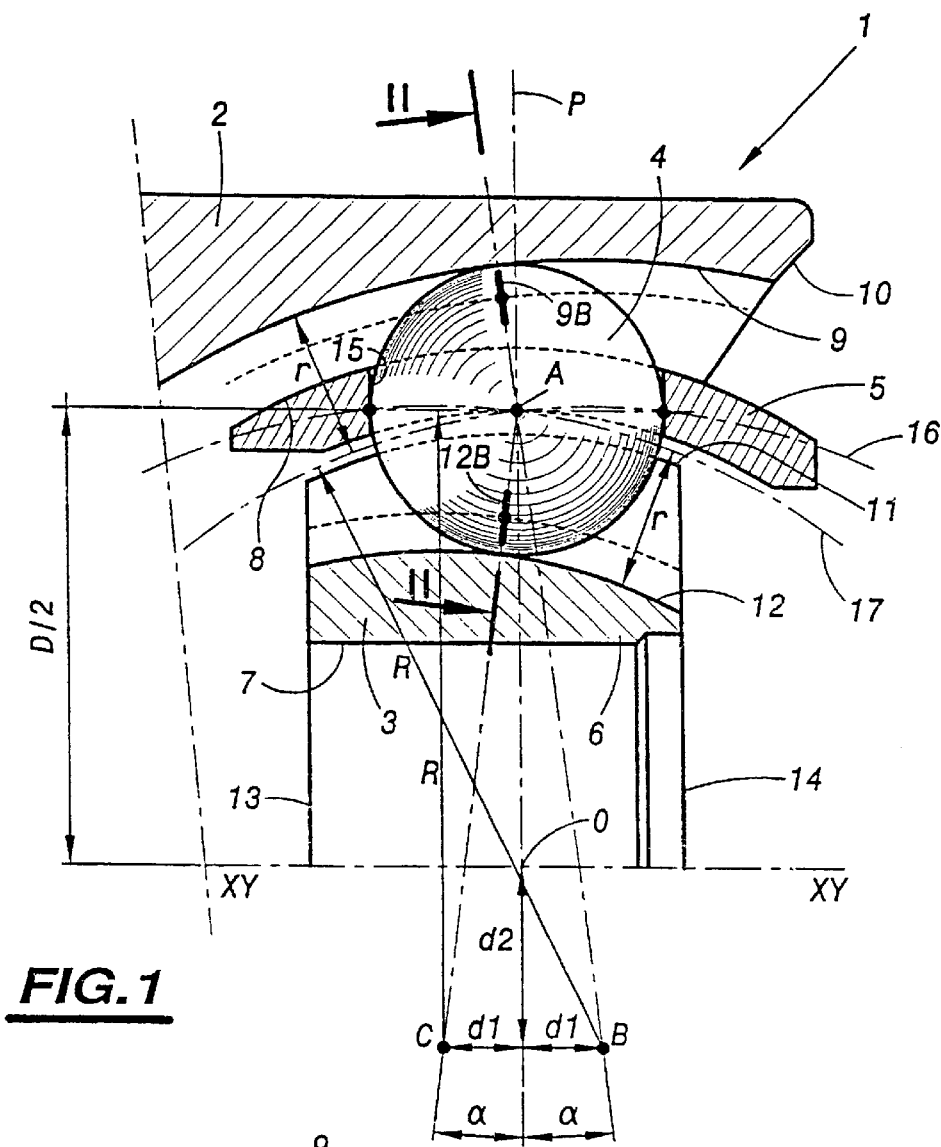
FIG. 1 is a partial half-view in axial section of a ball joint according to the invention, in an aligned position.
Figure 2:
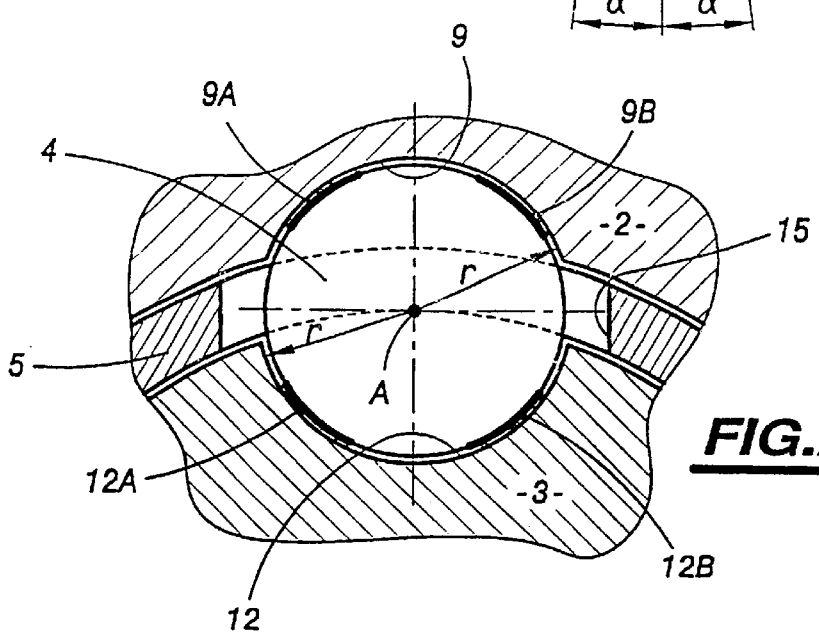
FIG. 2 is a partial view in cross section taken along the broken line II—II in FIG. 1.
Figure 3:
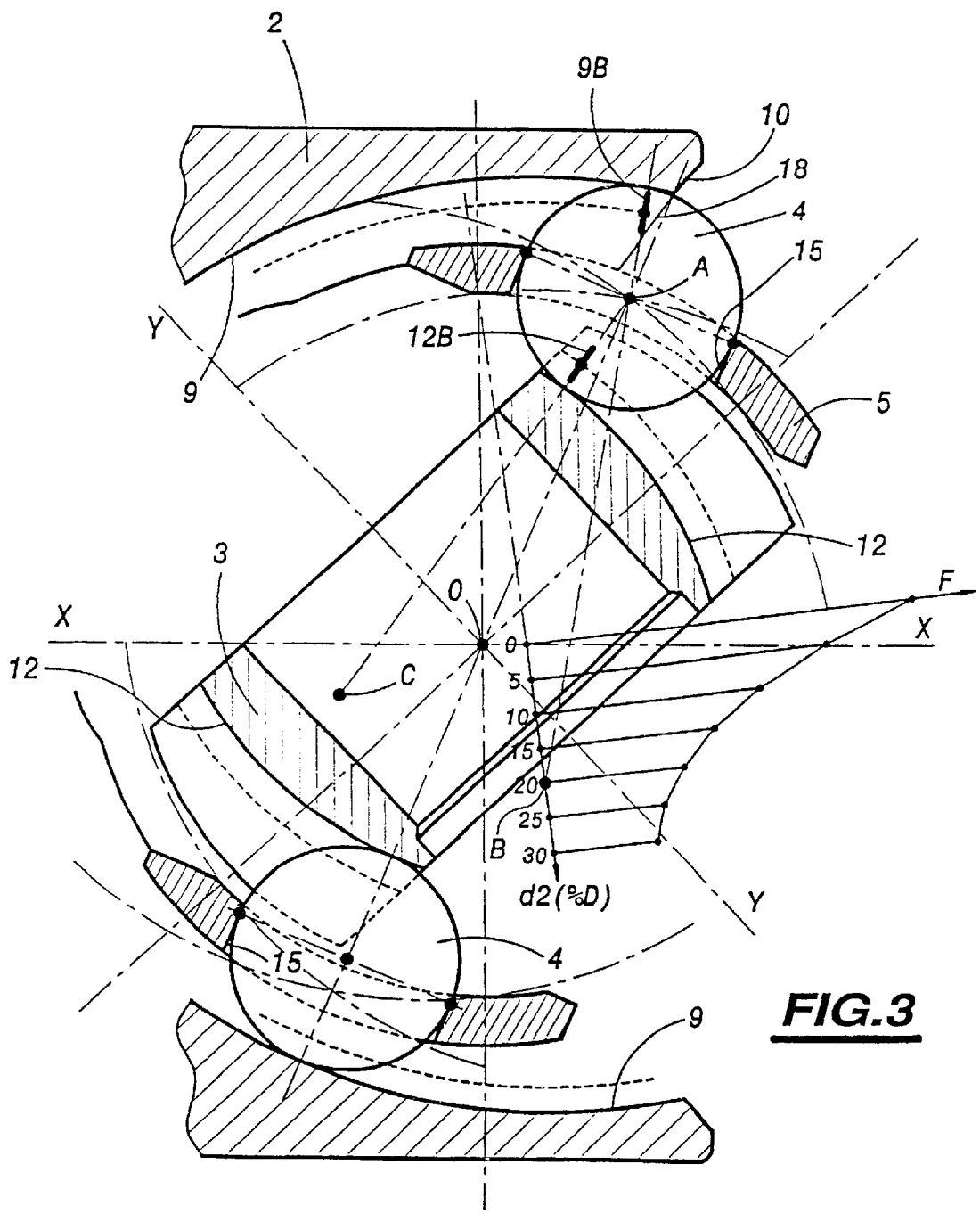
FIG. 3 is a partial view in axial section of the same ball joint in a maximum break position.

A constant-velocity joint 1, part of which is shown in FIGS. 1 to 3, has two main components, namely an exterior bell 2 and an interior hub or nut 3, as well as six balls 4 and a cage 5 for keeping the balls in the bisector plane of the joint. When the joint is assembled, the bell 2 is fastened to a first shaft (not shown) which has an axis X—X and the nut 3 is fastened to a second shaft (not shown) which has an axis Y—Y. Those two axes are coincident in FIG. 1, in which the joint is aligned. The angle between them is approximately 45° in the maximum break position shown in FIG. 3.

The bell is typically integral with the first shaft, which is a driving wheel stub axle, and the nut is fixed to the second shaft, which is a drive shaft, by means of axial splines 6 in its central opening 7.

The bell 2 has a spherical cavity 8 with its center O on the axis X—X. The cavity is open on the side toward the second shaft and six equi-angularly distributed first grooves 9, each of is contained in an axial plane of the bell, are formed in its wall. Each groove extends to either side of the diametral plane P of the bell perpendicular to the axis X-X and opens onto an entry bevel 10 of the bell.

The nut 3 has a spherical exterior surface 11 with its center at O and in which are formed six equi-angularly distributed second grooves 12 each of which is contained within an axial plane of the nut. The grooves 12 extend to either side of the diametral plane of the nut, which is coincident with the plane P when the joint is aligned, and they open onto the two end faces of the nut, namely the interior end face 13 and the exterior end face 14, which are parallel to said diametral plane P.

The grooves 9 and 12 have substantially circular cross sections with the same radius r (FIG. 2).

The cage 5 has exterior and interior spherical surfaces with their center at O and which respectively cooperate with the aforementioned surfaces 8 and 11. It further includes six openings 15 each of which guides a ball 4. Each ball has a radius substantially equal to r and cooperates with a pair of grooves 9, 12 in two pairs of contact areas 9A, 9B, 12A, 12B indicated in thicker line in FIGS. 1 and 2.

The locus of the center A of the cross section of a groove is referred to as its director line. That line also represents the trajectory of the center of the associated ball 4 in the part concerned during operation of the joint. The director line for each groove is a circular arc throughout its active length. All these circular arcs have the same radius R.

In the aligned position of the joint, in each of the aforementioned three axial planes, for example that of FIG. 1, the center B of the director line 16 of the groove 9 is offset axially relative to the transverse diametral plane P a distance d1 toward the entry of the bell. The center C of the director line 17 of the groove 12 is offset axially relative to the same plane P by the same distance d1 toward the back of the bell. The geometry is chosen so that the pilot angle $2\alpha$ of the straight line segments AB and AC, defined by the equation $\sin\alpha = d1/R$, has a predetermined value, typically $2 \times 7°$.

The centers B and C are also offset radially relative to the respective axes X—X and Y—Y, on the side opposite the grooves 9 and 12, by the same distance d2.

It follows from the above definition of the director lines that the bottom of the groove 9 is a single circular arc with its center at B and of radius (R+r) and that the bottom of the groove 12 is a single circular arc with its center at C and of radius (R−r).

The distance D between the centers A of the two balls contained in the plane P when the joint is aligned is referred to as the Pitch Circle Diameter (PCD) of the joint. The aforementioned radius offset d2 is then defined by the equation:

$$0.15D \leq d2 \leq 0.25D \qquad (1)$$

Surprisingly, this choice of the value of d2 has been found to impart considerably improved mechanical properties to the joint, which will be now be explained with reference to FIGS. 3 and 4.

FIG. 3 shows the joint in the maximum break position in the break plane. The ball 4 contained in that plane and exterior to the break angle then comes into contact with the groove 9 very close to its entry edge 18, which is the edge where it intersects the bevel 10.

FIG. 3 shows diagrammatically, and for a given motor torque, the intensity F of the contact force at this location as a function of the radial offset d2 of the center B, expressed as a percentage of the pitch circle diameter D. Note that the force F decreases rapidly as d2 increases and that the rate of reduction slows significantly towards 20% to 25% of D. From approximately 25% of D the improvement is no longer significant.

Figure 4:
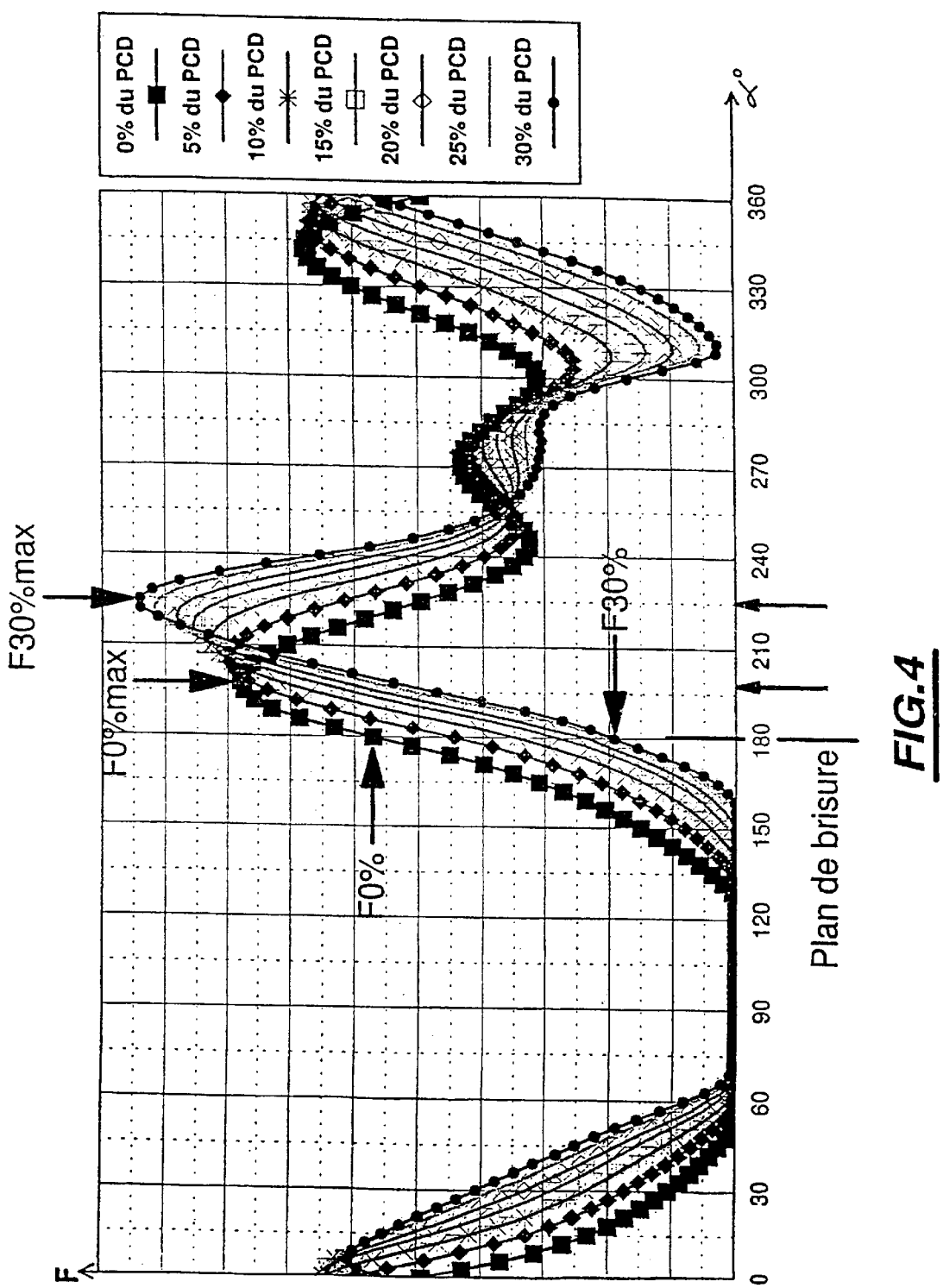
FIG. 4 is a force-angle diagram that helps to explain the advantages of the invention.

FIG. 4 shows the variation in the contact force between a given ball and the groove 9 for one revolution of the joint, the origin of the angles α being the position of the bottom ball 4 in FIG. 3. The diagram includes six curves which correspond to radial offsets of the center B of 0%, 5%, 10%, 15%, 20%, 25% and 30% of D, with the modes of representation indicated on the right of FIG. 4.

The diagram highlights two phenomena:

the maximum force $F_{max}$ increases as the radial offset increases; and the force $F_{max}$ is operative for an angle which is close to 180° for a zero radial offset and which departs increasingly from that value as the offset increases.

The diagram also confirms that, in the break plane (80° angle), the contact force F decreases greatly as the radial offset increases.

Accordingly, the maximum forces corresponding to values of the radial offset up to approximately 25% of D remain acceptable because, although they are greater than those corresponding to a zero radial offset, they occur when the top ball 4 is already at a significant distance from the edge 18, with the result that the risk of this region of the bell collapsing is considerably reduced.

Analyzing the contact forces between the balls and the grooves 12 leads to similar results.

Bringing together all of the results analyzed hereinabove, it can be seen that the aforementioned equation (1) provides an optimum range of values of the radial offset d2 of the centers B and C, in which:

in the break plane, the forces which are exerted very close to the edge of the groove 9 are greatly reduced; and the maximum force $F_{max}$, although increased, remains acceptable for the bell and for the nut.

A value of the radial offset close to 20% of D is considered to be particularly advantageous.

What is claimed is:

1. A fixed constant-velocity ball joint comprising:

a bell adapted to be made integral with a first shaft, a cavity of said bell being at least partly spherical and incorporating six first grooves, a director line of each first groove being contained within an axial half-plane of the bell;

a hub adapted to be made integral with a second shaft, an exterior surface of said hub being at least partly spherical and incorporating six second grooves, a director line of each second groove being contained in an axial half-plane of the hub;

six balls partly received in respective pairs of said first and second grooves; and a cage for maintaining said balls in a bisector plane of said joint when said joint is broken, said cage having spherical exterior and interior surfaces substantially conjugate with spherical surfaces of said bell and of said hub, respectively, the enters of said director lines of said two grooves in each of said axial half-planes, in the aligned position of said joint, being offset axially and symmetrically relative to the transverse diametral plane of said joint and offset radially by the same distance relative to the central axis of said joint on the side opposite said grooves, wherein said radial offset is from approximately 15% to approximately 25% of a pitch circle diameter of said joint.

2. The constant-velocity joint claimed in claim 1, wherein said radial offset is from approximately 18% to approximately 22% of said pitch circle diameter.

3. The constant-velocity joint claimed in claim 2, wherein said radial offset is substantially equal to 20% of said pitch circle diameter.

4. The constant-velocity joint claimed in claim 1, wherein said radial offset is the same for all said axial half-planes.

5. The constant-velocity joint claimed in claim 1, wherein each director line comprises a single circular arc throughout its active length.

6. An automobile vehicle transmission which includes:

a bell integral with a first shaft, a cavity of said bell being at least partly spherical and incorporating six first grooves, a director line of each first groove being contained within an axial half-plane of the bell;

a hub integral with a second shaft, an exterior surface of said hub being at least partly spherical and incorporating six second grooves, a director line of each second groove being contained in an axial half-plane of the hub;

six balls partly received in respective pairs of said first and second grooves; and a cage for maintaining said balls in a bisector plane of said joint when said joint is broken, said cage having spherical exterior and interior surfaces substantially conjugate with spherical surfaces of said bell and of said hub, respectively, the centers of said director lines of said two grooves in each of said axial half-planes, in the aligned position of said joint, being offset axially and symmetrically relative to the transverse diametral plane of said joint and offset radially by the same distance relative to the central axis of said joint on the side opposite said grooves, wherein said radial offset is from approximately 15% to approximately 25% of the pitch circle diameter of said joint.

7. An automobile vehicle which includes at least one transmission including at least one fixed constant-velocity ball joint comprising:

a bell integral with a first shaft, a cavity of said bell being at least partly spherical and incorporating six first grooves, a director line of each first groove being contained within an axial half-plane of the bell;

a hub integral with a second shaft, an exterior surface of that nut being at least partly spherical and incorporating six second grooves, a director line of each second groove being contained in an axial half-plane of the hub;

six balls partly received in respective pairs of said first and second grooves; and a cage for maintaining said balls in a bisector plane of said joint when said joint is broken, said cage having spherical exterior and interior surfaces substantially conjugate with spherical surfaces of said bell and of said hub, respectively, the centers of said director liens of said two grooves in each of said axial half-planes, in the aligned position of said joint, being offset axially and symmetrically relative to the transverse diametral plane of said joint and offset radially by the same distance relative to the central axis of said joint on the side opposite said grooves, wherein said radial offset is from approximately 15% to approximately 25% of the pitch circle diameter of said joint.

* * * * *